US008923142B2

United States Patent
Mångs et al.

(10) Patent No.: US 8,923,142 B2
(45) Date of Patent: Dec. 30, 2014

(54) PASSIVE MONITORING OF NETWORK PERFORMANCE

(75) Inventors: Jan-Erik Mångs, Solna (SE); Svante Ekelin, Vallentuna (SE); Bob Melander, Sigtuna (SE); Christofer Flinta, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 863 days.

(21) Appl. No.: 12/530,362

(22) PCT Filed: Mar. 8, 2007

(86) PCT No.: PCT/SE2007/050134
§ 371 (c)(1),
(2), (4) Date: Jan. 18, 2010

(87) PCT Pub. No.: WO2008/108697
PCT Pub. Date: Sep. 12, 2008

(65) Prior Publication Data
US 2010/0150009 A1    Jun. 17, 2010

(51) Int. Cl.
*G01R 31/08* (2006.01)
*H04L 12/28* (2006.01)
*H04L 12/26* (2006.01)
*H04L 12/24* (2006.01)

(52) U.S. Cl.
CPC ........ *H04L 12/2697* (2013.01); *H04L 43/0864* (2013.01); *H04L 41/5009* (2013.01); *H04L 43/50* (2013.01); *H04L 41/0896* (2013.01); *H04L 41/5003* (2013.01); *H04L 43/106* (2013.01)
USPC ............ 370/252; 370/253; 370/389; 370/392

(58) Field of Classification Search
CPC ........................ H04L 12/2471; H04L 41/5009
USPC .......................................................... 370/503
See application file for complete search history.

(56) References Cited

U.S. PATENT DOCUMENTS 5,521,907 A    5/1996  Ennis
6,785,237 B1   8/2004  Sufleta
(Continued)

FOREIGN PATENT DOCUMENTS

EP    1202491 A2    5/2002
EP    0786883 B1    5/2006

OTHER PUBLICATIONS

Ekelin, S. et al, Continuous Monitoring of Available Bandwidth over a Network Path. In: 2nd Swedish National Computer Networking Workshop (SNCNW 2004), Nov. 23-24, 2004, Karlstad University, Karlstad.

*Primary Examiner* — Brandon Renner

(57) ABSTRACT

The present invention relates to methods and arrangements to measure network performance. The method comprises the following steps: —Transmitting via a communication network (IP) payload packets (21-24) from a sending node (GGSN/A) to a receiving node (GGSN/B). —Generating at the sending node (GGSN/A) a send specification (s21-s24, sid21-sid24) for each of at least one selected packet (21-24) of the transmitted payload packets (21-24). —Generating at the receiving node (GGSN/B), a receive specification (r21-r22, rid21-rid22, siz21-siz22) for each of at least one selected packet (21-22) of the transmitted payload packets (21-24). —Bringing together generated send specifications (s21-s24, sid21-sid24) and generated receive specifications (r21-r22, rid21-rid22, siz21-siz22). —Estimating network performance by utilizing corresponding specifications (s11-s12, r11-r12, siz21-siz22) of the brought together specifications.

10 Claims, 5 Drawing Sheets

(56) References Cited

U.S. PATENT DOCUMENTS

| | | | |
|---|---|---|---|
| 7,483,450 B1 * | 1/2009 | Giese et al. | 370/507 |
| 2004/0062278 A1 * | 4/2004 | Hadzic et al. | 370/503 |
| 2005/0111487 A1 * | 5/2005 | Matta et al. | 370/468 |

* cited by examiner

PASSIVE MONITORING OF NETWORK PERFORMANCE

TECHNICAL FIELD

The present invention relates to methods and arrangements for measuring communication network performance.

BACKGROUND

Measurement of network characteristics can be performed using methods which include active probing of the network, i.e. injecting dedicated probe packets for the sole purpose of the measurement method. One example is disclosed in the U.S. Pat. No. 6,868,094 wherein an IP performance monitoring method is shown. In the US patent a timing probe data packet containing a send time stamp is sent over the network from a sender to a receiver. A receive time stamp is generated at the receiver. The probe packets sender performance is analyzed based upon the send and receive stamps. Another example is the BART method for available bandwidth estimation, developed at Ericsson A B. Aspects of BART has been published at several conferences such as:

[1] S. Ekelin and M. Nilsson, "Continuous monitoring of available bandwidth over a network path", $2^{nd}$ Swedish National Computer Networking Workshop, Karlstad, Sweden, Nov. 23-24, 2004.

[2] S. Ekelin, M. Nilsson, E. Hartikainen, A. Johnsson, J.-E. Mångs, B. Melander and M. Björkman, "Real-time measurement of end-to-end available bandwidth using Kalman filtering," in *Proc. 10th IEEE/IFIP Network Operations and Management Symposium*, 2006.

[3] E. Hartikainen and S. Ekelin, "Tuning the Temporal Characteristics of a Kalman-Filter Method for End-to-End Bandwidth Estimation," in *Proc. 4th IEEE/IFIP Workshop on End-to-End Monitoring Techniques and Services*, 2006.

[4] E. Hartikainen and S. Ekelin, "Enhanced Network-State Estimation using Change Detection," in *Proc. 1st IEEE LCN Workshop on Network Measurements*, 2006.

In an active probing method, each probing packet receives a time stamp as it is sent from the sending node. When reaching the receiving node it is time-stamped again, and the time stamps are fed into an algorithm in order to calculate an estimate of the characteristics parameters. When estimating available bandwidth, also the sizes of the probe packets are needed by the algorithm.

The probing packets are normally sent in pairs or in packet trains. The number of packets in a train may vary according the probing method. However, a train must consist of at least two packets. BART is essentially a packet-pair method, and in the cases where probe packet trains of length N>2 are used, the train can essentially be seen as a sequence of N−1 probe packet pairs, where all the interior packets double as being the first in one pair and the second in another.

The time interval between sent probe packets is selected by the probing algorithm in order to achieve a specific probing load on the network path. This time interval is related to the probe packet size; a smaller time interval between packets with a given packet size will give a higher probing load.

One reason for using pairs (or trains) as opposed to sending isolated probe packets is that the need for synchronization between sender and receiver is eliminated.

In the basic version of BART, no feedback from receiver to sender is assumed. The algorithm can be considered to be running at the receiver, and all input needed must then be accessible at the receiver.

Probing can be used in different ways. One possibility is probing end-to-end, i.e. from one sending host to one receiving host. Another scenario is probing edge-to-edge, i.e. from one aggregating node to another aggregating node.

One problem is that active probing increases the traffic load on the network, since probe packets normally don't carry any payload. If the use of probing-based measurement methods starts to grow, this could cause significant volumes of extra network traffic.

SUMMARY

The present invention relates to a problem with unwanted increased traffic load on a communication network caused by high probing overhead during measurement of network characteristic.

The problem is solved by the invention by generating send specifications related to payload packets selected out of packets sent from a sending node to a receiving node. Receive specifications selected out of sent payload packets are generated at the receiving node. The generated send specifications and receive specifications are brought together and network performance is estimated by utilizing corresponding specifications. The specifications include the information necessary for the estimation algorithm at hand. In some embodiments this could be time stamp, packet size and/or packet identifier.

The solution to the problems more in detail is a method of measuring network performance, comprising the following steps:

Payload packets are transmitted via a communication network from a sending node to a receiving node.

A send specification is generated at the sending node for each of at least one selected packet of the transmitted payload packets;

A receive specification is generated at the receiving node, for each of at least one selected packet of the transmitted payload packets.

Generated send specifications and generated receive specifications are brought together, Network performance is estimated by utilizing corresponding brought together specifications.

In one aspect of the invention all transmitted payload packets are selected at the sending node while at least one packet is selected at the receiving node.

In another aspect of the invention at least one packet is selected at the sending node while all transmitted payload packets are selected at the receiving node.

In yet another aspect of the invention generated send specifications and generated receive specifications are brought together in the receiving node while according to another aspect the specifications are brought together in the sending node or in a third node.

A purpose with the invention is to decrease the load on the network caused by fragmentary utilized packets sent over the network during network characteristic measurement. This purpose and others are achieved by methods, arrangements, nodes, systems and articles of manufacture.

A main advantage of the invention is that the probing overhead is significantly reduced, as compared to standard probing methods, where the probe packets don't carry any payload, and are thus fully and completely overhead. The extra traffic load caused by measuring using this method will only be a specification list. The bulk of the traffic needed for this probing method is thus constituted by the payload packets, which would anyway need to be transmitted.

Examples of usage are:

Adaptive applications where the sending rate is adapted to the available bandwidth, e.g. IPTV.

Base stations interconnected via Internet access in future RAN, detecting available bandwidth and using CAC for telephony services.

Measuring bandwidth between Enterprise sites in order to shape traffic from different applications.

Verification of SLA between customer and network provider

The invention will now be described more in detail with the aid of preferred embodiments in connection with the enclosed drawings.

DETAILED DESCRIPTION

Figure 1:
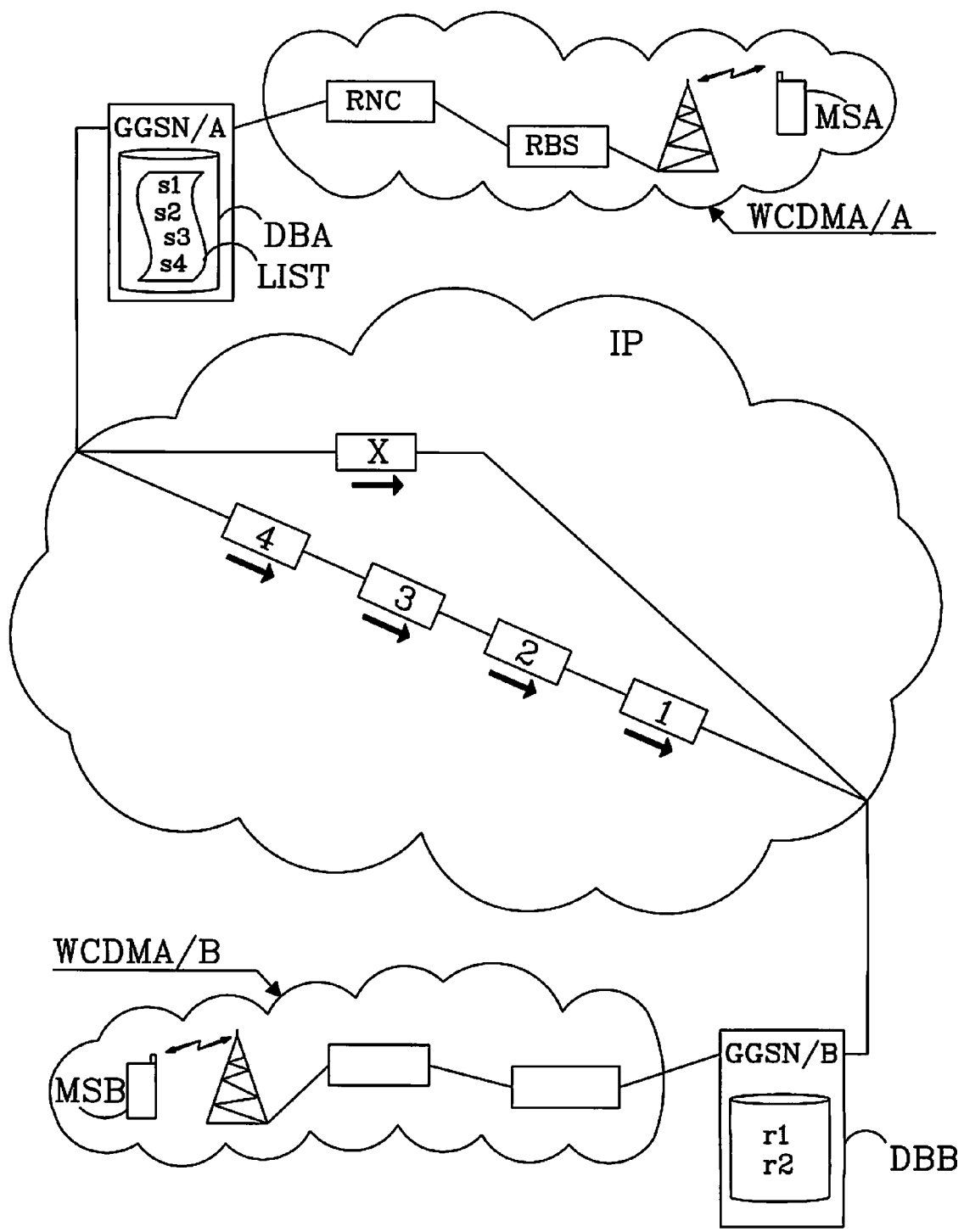
FIG. 1 discloses a block schematic illustration of data packets sent between WCDMA networks over an IP network. Send time stamps are in this example generated at a sending side for all sent packets.

FIG. 1 discloses a system that can be used to put a first embodiment of the invention into practice. In FIG. 1 is shown an Internet Protocol IP network system in which voice or other time-sensitive data are sent in payload parts of packets from a server to a client or vice versa. Some examples of data are real-time image and voice, still image and text. Two access networks WCDMA/A, WCDMA/B of the type Wideband Code Division Multiple Access mobile communication systems are shown in FIG. 1. A mobile terminal/subscriber MSA is located in the WCDMA/A network and communicates via a Radio Base Station RBS. Packets from MSA are hereby sent from the RBS to a Radio Network Controller RNC in the WCDMA/A. The RNC is the main element in a Radio Network Subsystem that controls the use and the reliability of the radio resources. Packets arriving from terminal MSA are forwarded from the RNC to a Gateway GPRS Support Node GGSN/A in packet domain. The GGSN/A supports the edge routing function of the GPRS network. GGSN/A performs the task of an IP router to external packet data networks. In this example, as indicated in FIG. 1, packets are sent from WCDMA/A via the IP network to WCDMA/B. A mobile terminal/subscriber MSB is located within WCDMA/B network that is attached to the IP network via a Gateway GPRS Support Node GGSN/B. In FIG. 1 a packet stream 1-4 can be seen in the IP network. In the example that will be further explained below, information such as data and/or voice from terminal MSA is sent as payload packets 1-4 from GGSN/A, via the IP network and via the GGSN/B to terminal MSB. Send time stamps s1-s4 representing send time of day may be generated in the GGSN/A out of packets sent from GGSN/A. Send time stamps are then stored in a LIST in a database DBA in the GGSN/A. In the same way receive time stamps r1-r2 representing receive time of day may be generated in the GGSN/B from the packets when received to GGSN/B, in a database DBB in the GGSN/B.

A method of measuring network performance according to the invention will know be explained together with FIG. 1. The method comprises the following steps:

A stream of packets 1-4 aimed for terminal MSB is sent from terminal MSA to GGSN/A. Each packet comprises a header section and a payload section. While the header section comprises information such as time correction and parity bits, the payload section comprises the actual data information such as e.g. speech. From now on the packets 1-4 will be called payload packets 1-4.

The payload packets 1-4 are transmitted one by one from the sending node GGSN/A via the Internet Protocol network IP to the receiving node GGSN/B.

A send specification that in this example is a send time stamp s1-s4 for each packet 1-4 which is generated in the sending node GGSN/A. A send time stamp indicates a packet's send time of day from the GGSN/A. Important to note is that in this embodiment all packets sent from GGSN/A to GGSN/B are send time stamped.

The time stamps s1-s4 are stored in the GGSN/A, in a storage, a so called LIST, in the database DBA.

The payload packets 1-4 are received, one by one, to the receiving node GGSN/B from the sending node GGSN/A.

Payload packets that are of interest to analyse are selected in the GGSN/B to be receive time stamped. A receive time stamp indicates a packet's receive time of day to the GGSN/B. The selection is based upon certain pre-defined criteria that will be further discussed below. In this example the payload packets 1 and 2 are selected among the sequence of packets arriving from GGSN/A. A receive specification that in this example comprises a receive time stamp r1 and r2 for each selected packet 1 and 2 is generated and stored in the database DBB.

According to the invention, the time stamp LIST comprising stored send time stamps s1-s4 is placed in a payload section of a packet X.

The packet X is transmitted from the sending node GGSN/A via the Internet Protocol network IP to the receiving node GGSN/B. It is to be noted that the type of transmission path for the packet X through the IP network is of minor importance for the invention. Also a transmission path outside the IP network could be possible without influencing the general idea behind the invention. In order to find out which send and receive time stamps that correspond i.e. belong to the same packet, a packet numbering procedure will be necessary both of send time stamps arriving in the LIST and of packets arrived to GGSN/B from GGSN/A. This requires however that no packets are lost during transmission since that would cause shift of the packet sequence numbering.

The time difference between the selected received packets 1 and 2 i.e. the time difference $\Delta out = r2 - r1$ is calculated in the GGSN/B. The send time difference between corresponding payload packets 1 and 2 i.e. the time difference $\Delta in = s2 - s1$ is also calculated in the GGSN/B. The time differences $\Delta out$ and $\Delta in$ are handled in an algorithm to create a BART estimate of available bandwidth. The BART method for available bandwidth estimation is well known to those of skill in the art. Aspects of BART have been published at several conferences, see for example those mention in the BACKGROUND part of this application. To be observed is that the BART method is just one example and not the only method that can be used to estimate network performance by using the invention.

As mentioned above, the selection of packets can be based upon certain pre-defined criteria. Packet identifications may be created so receive time stamps can be correlated with send time stamps. This can be done for example by calculating a hash sum for each selected packet sent from GGSN/A, and put the calculated hash sum and adherent send time stamp in the LIST. At the receiving side, a hash sum for each selected received packet is calculated in the GGSN/B. By comparing hash sums arriving in the LIST to the receiving side with calculated hash sums for received packets, corresponding packets (time stamps) can be found. In case all packets are considered selected packets i.e. a hash sum is calculated for all packets both on the sending and on the receiving side, a further selection procedure may be applied. Examples of further selection procedures are as follows:

1. The selection is based on a pre-defined rule, for example, packets are selected if having a pre-defined value, or a value within a defined interval, in a specific field in the TCP/IP header (DSCP, TCP port number, IP-sender address . . . ). A selection of this type does not have to be communicated between the sending and receiving side. The selection may be based on the IP-addresses for WCDMA/A and/or WCDMA/B so that packets aimed for other networks than WCDMA/B not have to be selected by GGSN/A, and so that GGSN/B not have to select packets from other networks than WCDMA/A. To be noted is that this selection procedure of course also can be used without the above mentioned hash sum calculation, but then still with a remaining risk of errors due to packet loss.
2. Only packets with a certain time distance from a previous packet is selected. This type of selection is controlled by only one of the nodes, and needs the hash sum calculation. If for example GGSN/A selects the packets, only hash sum and time stamp for selected packets are sent in the LIST to GGSN/B, a so called short list. In GGSN/B the hash sum for all received packets are calculated and put in a list, a so called long list. The short and long lists are brought together and packets with corresponding hash sums are used to estimate the network performance.

The use of hash sums to find corresponding packets is just an example and as is obvious to someone skilled in the art, also other methods can be used. Only one pair of terminals A and B is shown in the example above. Apparent to someone skilled in the art is that also aggregated packet streams between more than one terminal pair are applicable when using the invention. To be noted is also that instead of an IP network, other type of networks may be used such as for example an Asynchronous Transfer Mode ATM network. Furthermore, the packets received from MSA to the sending side can be in two ways. One way is "as-we-get-it", with creation times depending on the applications. In this scenario statistical fluctuations will ensure enough spreading of creation times to get good estimations. Another scenario is to shape some of the traffic in a way that suites the estimation method, e.g. by sending the packets as packet trains with specific time intervals between the packets.

Figure 2:
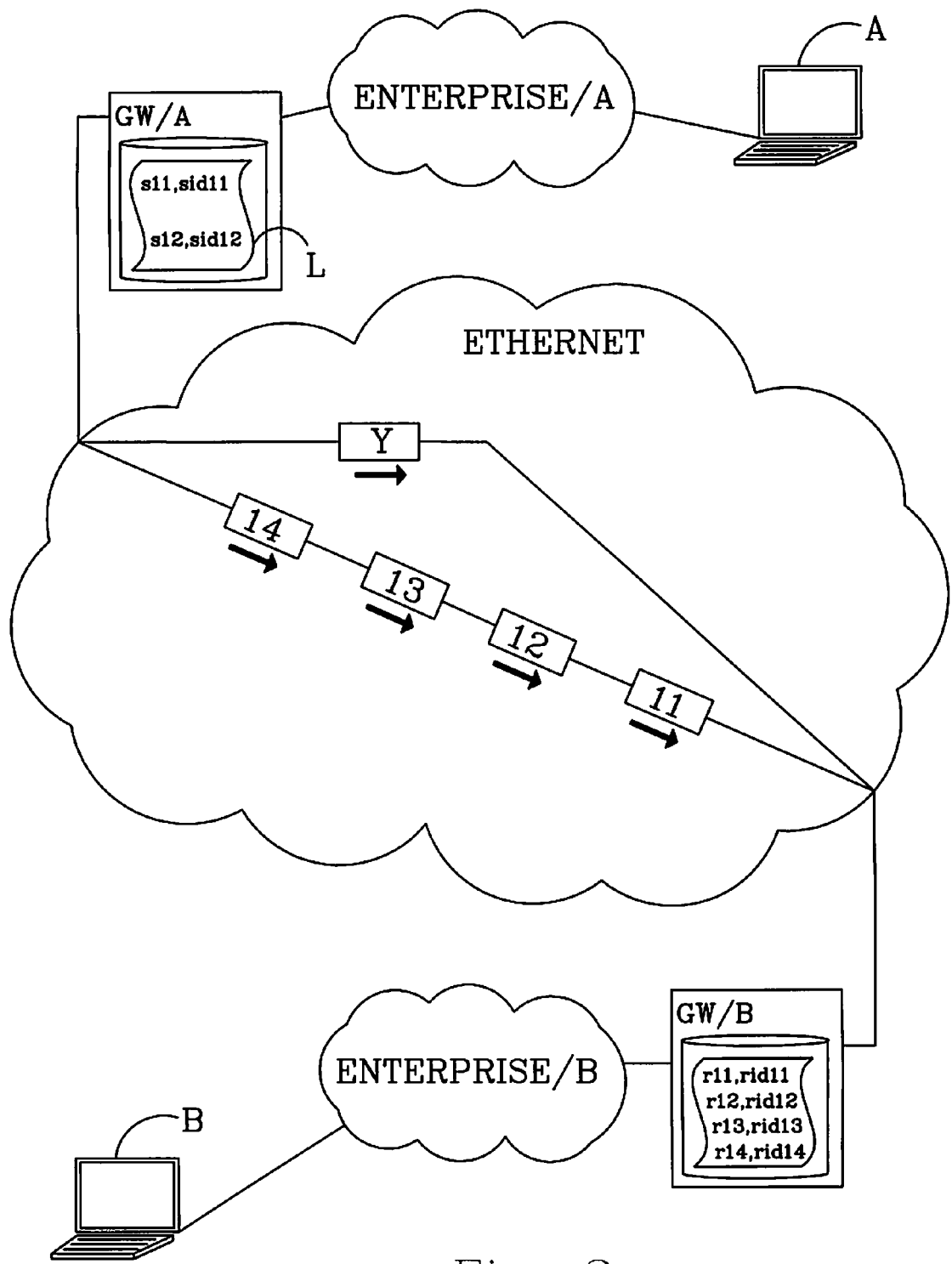
FIG. 2 discloses a block schematic illustration of data packets sent between Enterprise networks over an ethernet network. Receive time stamps are in this example generated at a receiving side for all sent packets.

In a second embodiment that now will be discussed, the use of hash sums to identify packets will be further discussed. FIG. 2 discloses the second embodiment of the invention. In FIG. 2 is shown two Enterprise networks ENTERPRISE/A/B that communicates via an Ethernet based network. In the computer industry, the term Enterprise is often used to describe any large organization that utilizes computers. An intranet, for example, is an example of an enterprise computing system. Ethernet comprises Local Area Network architecture. Ethernet uses a bus or star topology and currently supports data transfer rates from 10 Mbps to 10 Gbps. The Ethernet specification served as the basis for the IEEE 802.3, which specifies the physical and lower software layers.

In FIG. 2 a terminal/subscriber A is attached to ENTERPRISE/A. Subscriber A communicates via a GateWay node GW/A with the ETHERNET based network. In the same way, a terminal/subscriber B is attached to ENTERPRISE/B that communicates via a GateWay node GW/B with the ETHERNET. In FIG. 2 a packet stream 11-14 can be seen in the ETHERNET network. In this embodiment information such as data from terminal A is sent as payload packets 11-14 from GW/A, via the ETHERNET network and via the GW/B to terminal B. Send time stamps, representing packets' send time of day and packets' hash sum, representing packets' identification may be generated in the GW/A out of packets sent from GW/A, and then stored in a list L in a database in the GW/A. In the same way packets' receive time stamps and packets' hash sum may be generated in the GW/B from packets received to GW/B, in a database in the GW/B.

A method of measuring network performance according to the second embodiment of the invention will now be explained together with FIG. 2. The method comprises the following steps:

A stream of packets 11-14 aimed for terminal B is sent from terminal A to GW/A. Each packet comprises a header section and a payload section. The payload section comprises the actual data.

The payload packets 11-14 are transmitted one by one from the sending node GW/A via the ETHERNET network to the receiving node GW/B.

A send specification that in this example comprises a send time stamp and a packet identification s11-s12, sid11-sid12 for each selected packet is generated in the sending node GW/A. Payload packets that are of interest to analyse are hereby selected in the GW/A to be send time stamped and identified. Important to note is that in this embodiment not all packets sent from GW/A to GW/B are send time stamped and identified but just packets 11 and 12. In this example the packets 11 and 12 are selected due to a pre-defined value that was found in the packets' protocol headers.

The time stamps/identifications s11-s12, sid11-sid12 are stored in the GW/A, in a list L in the database, a so called short list.

The payload packets 11-14 are received from the sending node GW/A to the receiving node GW/B, one by one.

All the payload packets 11-14 received to GW/B from GW/A are selected in GW/B to receive a specification i.e. to be receive time stamped/identified r11-r14, rid11-rid14. The identification is performed, like in the GW/A, by calculating the packets' hash sums. Time stamps and identifications r11-r14, rid11-rid14 are placed in a list, a so called long list, in GW/B.

According to the invention, the time stamp list L comprising stored send time stamps s11-s12 and identifications sid11-sid12 is placed in a payload section of a packet Y.

The packet Y is transmitted from the sending node GW/A via the ETHERNET to the receiving node GW/B. Like before, also a transmission path outside the IP network could be possible without influencing the general idea behind the invention.

The short list and long list are put together and the hash sums are compared in GW/B to determine which packets in the long list correspond to the selected packets in the short list. The send time difference between selected sending packets 1 and 2 i.e. the time difference $\Delta in=s12-s11$ is calculated in the GW/B. The time difference between the corresponding received packets 1 and 2 i.e. the time difference $\Delta out=r12-r11$ is calculated in the GW/B. The time differences $\Delta out$ and $\Delta in$ are handled in an algorithm to create a BART estimate of the available bandwidth.

Figure 3:
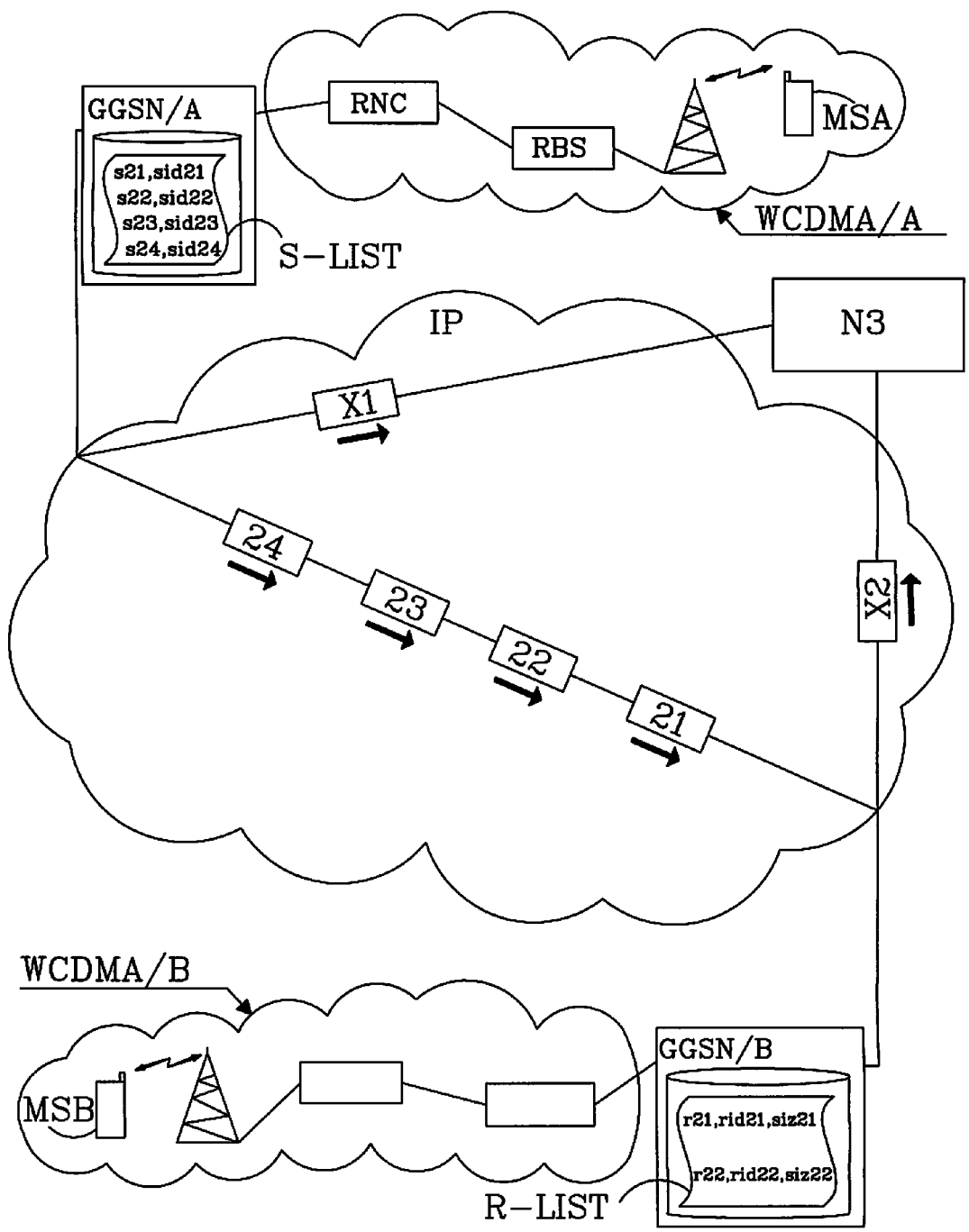
FIG. 3 discloses a block schematic illustration of data packets sent between WCDMA networks over an IP network. Send time stamps and receive time stamps are in this example sent to a validation centre.

FIG. 3 discloses a third embodiment of the invention. The system in FIG. 3 is in many parts equal to the system disclosed in FIG. 1 and is by that considered explained in the first embodiment. In this third embodiment, in FIG. 3 a third node N3 can be seen. The node N3 is a validation centre that can be located in any optional place in the system, for example in an operator's Network Operations Centre or in an enterprise's computer centre. In FIG. 3 a packet stream 21-24 can be seen in the IP network. In the example that will be further explained below, information such as data and/or voice from terminal MSA is sent as payload packets 21-24 from GGSN/A, via the IP network and via the GGSN/B to terminal MSB. Send time stamps representing send times of day s21-s24 and packet identifications sid21-sid24 may be generated in the GGSN/A out of packets sent from GGSN/A. Send time stamps/identifications are then stored in a S-LIST in the GGSN/A. In the same way receive time stamps representing receive time of day r21-r22 may be generated from packets received to GGSN/B and stored in an R-LIST in the GGSN/B. In this embodiment, an estimation of available bandwidth is desired and consequently the sizes of the packets are needed in an estimation algorithm and must be stored in the R-LIST.

A method of measuring network performance according to the third embodiment will know be explained together with FIG. 3. The method comprises the following steps:

A stream of packets 21-24 aimed for terminal MSB is sent from terminal MSA to GGSN/A in a way similar to the first embodiment.

The payload packets 21-24 are transmitted one by one from the sending node GGSN/A via the Internet Protocol network IP to the receiving node GGSN/B.

A send specification that in this example comprises send time stamps s21-s24 and identifications sid21-sid24 for each packet 21-24 is generated in the sending node GGSN/A. In this embodiment all packets sent from GGSN/A to GGSN/B are send-time stamped, and identified by hash sums.

The time stamps s21-s24 and identifications sid21-sid24 are stored in the GGSN/A, in the list S-LIST, a so called long list.

The payload packets 21-24 are received, one by one, to the receiving node GGSN/B from the sending node GGSN/A.

Payload packets that are of interest to analyse are selected in the GGSN/B to be receive time stamped and identified. In this example the payload packets 21 and 22 are selected, due to a suitable distance between the packets. Consequently a receive specification i.e. a receive time stamp r21 and r22 and hash sum identification rid21 and rid22 for each selected packet 21 and 22 is generated and stored in the list R-LIST, a so called short list. In this embodiment, also sizes siz21, siz22 of each selected packet are stored in the R-LIST. As an alternative the packet size instead could have been measured at the sending side and sent from there in the S-LIST.

The long list S-LIST comprising stored send time stamps/identifications s21-s24/sid21-sid24 is placed in a payload section of a packet X1.

The packet X1 is transmitted from the sending node GGSN/A via the Internet Protocol network IP to the validation centre N3.

The short list R-LIST comprising stored receive time stamps r21-r22, identifications rid21-rid22 and packet sizes siz21-siz22 is placed in a payload section of a second packet X2.

The second packet X2 is transmitted from the receiving node GGSN/B via the Internet Protocol network IP to the validation centre N3.

The short list and long list are put together and the hash sums are compared in GW/B. The time difference between the selected received packets 21 and 22 i.e. the time difference $\Delta out=r22-r21$ is calculated in the validation node N3. The send time difference between corresponding sending packets 21 and 22 i.e. the time difference $\Delta in=s22-s21$ is also calculated in the validation node N3. The time differences $\Delta out$ and $\Delta in$ together with the indicated sizes siz21-siz22 of the packets are handled in an algorithm to create an estimate of available bandwidth.

As a variation of the third embodiment, instead of doing the validation in N3 as in the third embodiment, or in the receiving node as in the first and second embodiment, the validation can be done in the sending node GGSN/A. In this case the S-LIST is detained in the sending node while the R-LIST is transmitted from the receiving node GGSN/B to the sending node GGSN/A where the validation is performed.

Figure 4:
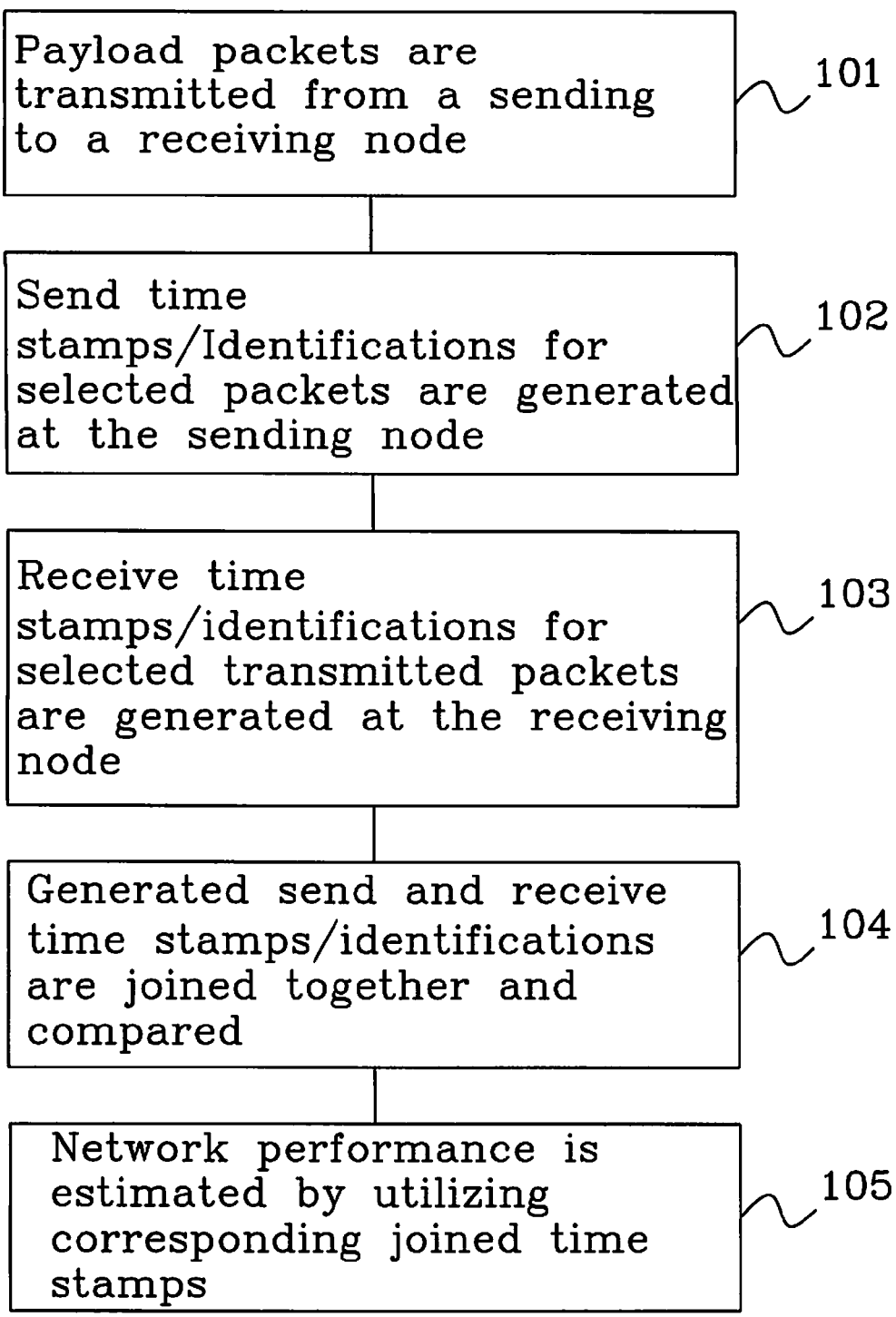
FIG. 4 discloses a flow chart illustrating some essential method steps of the invention.

FIG. 4 discloses a flow chart in which some of the more important steps of the invention are shown. The flowchart is to be read together with the earlier shown figures. The flowchart comprises the following steps:

Payload packets are transmitted from a sending node (GGSN/A; GW/A) via a communication network (IP; ETHERNET) to a receiving node (GGSN/B; GW/B). This step is disclosed in FIG. 4 with a block 101.

A send time stamp/identification for each of at least one selected packet (11-12; 21-24) of the transmitted payload packets (11-14; 21-24) is generated at the sending node (GGSN/A; GW/A). This step is disclosed in FIG. 4 with a block 102.

A receive time stamp/identification for each of at least one selected packet (11-14, 21-22) of the transmitted payload packets (11-14; 21-24) is generated at the receiving node (GGSN/B; GW/B). This step is disclosed in FIG. 4 with a block 103.

Generated send time stamps/identifications and generated receive time stamps/identifications are joined together and identifications are compared. This step is disclosed in FIG. 4 with a block 104.

Network performance is estimated by utilizing corresponding time stamps of the joined time stamps. This step is disclosed in FIG. 4 with a block 105.

Figure 5:
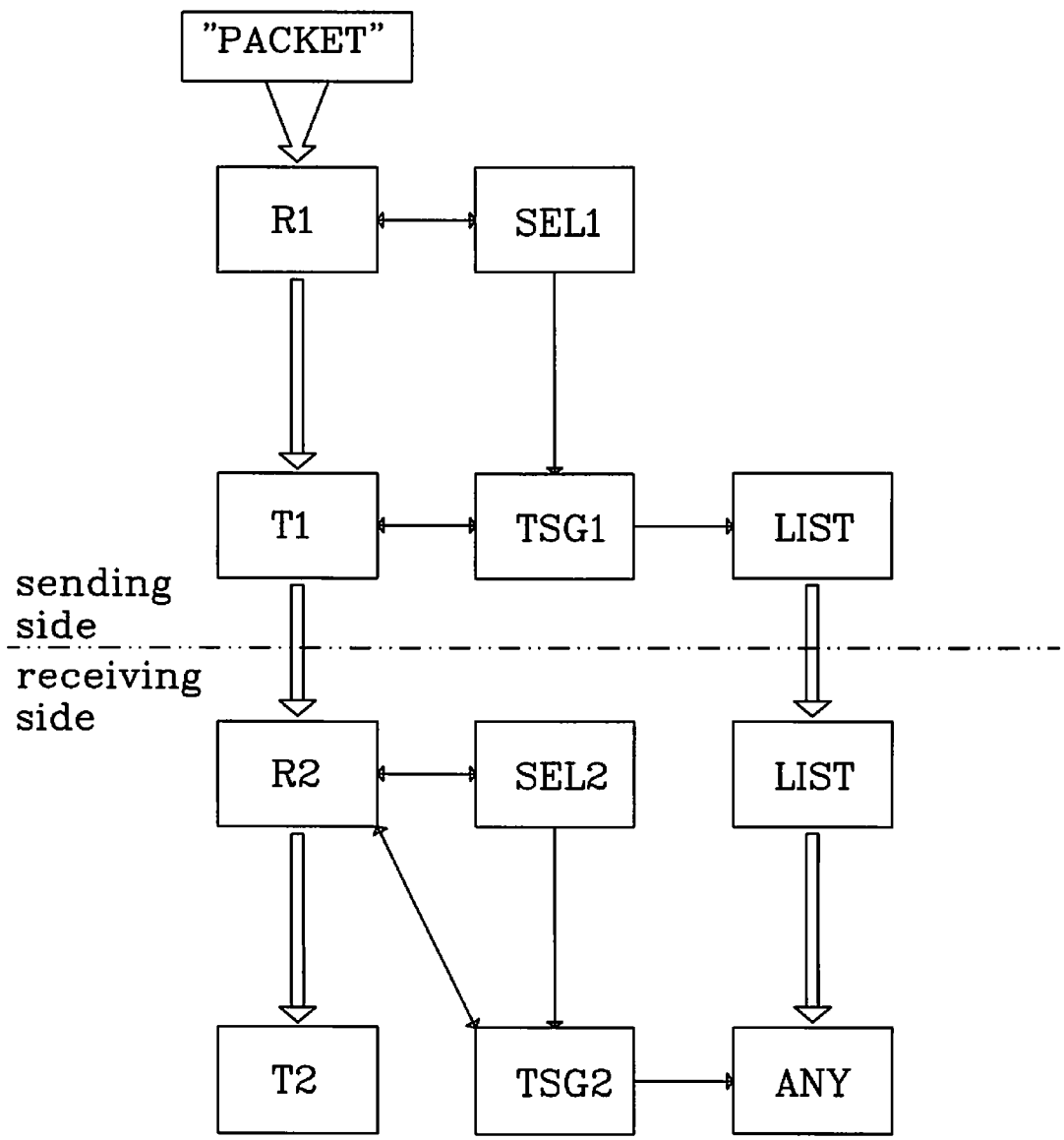
FIG. 5 schematically discloses a system that can be used to put the invention into practice.

An example of a system used to put the invention into practice is schematically shown in FIG. 5. The block schematic constellation corresponds to the ones disclosed in FIGS. 1 and 2 but is by no means limited to these two examples. FIG. 5 discloses a packet receiver R1 and a packet transmitter T1 on a sending side. A selector SEL1 decides which packets are of interest to further observe. SEL1 is connected to a Time Stamp and hash sum and/or packet size Generator TSG1 on the sending side. The TSG1 forwards send time stamps and identifications from selected packets to the list LIST. When receiving packets from the sending side to the receiving side, a receiver R2 forwards packets to a transmitter on the receiving side. A selector SEL2 decides which packets are of interest to further observe. SEL2 is connected to a Time Stamp and hash sum and/or packet size Generator TSG2 on the receiving side. The TSG2 forwards receive time stamps and potentially identifications and/or packet size from selected packets to an analyzing unit ANY. Also the LIST is forwarded from the sending to the receiving side. To obtain network characteristics, the ANY picks out corresponding packets by aid of the hash sums and handles receive time stamp together with send time stamps received in the LIST. As is obvious from the described third embodiment (FIG. 3), a send time stamp list can be sent to an analyzing unit that is located apart from R2. If so, a receive time stamp list will also be sent from TSG2 to this remote analyzing unit.

Items are shown in the figures as individual elements. In actual implementations of the invention however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The invention is not limited to the above described and in the drawings shown embodiments but can be modified within the scope of the enclosed claims. The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer.

The invention is in other words not limited to the above described and in the drawings shown embodiments but can be modified within the scope of the enclosed claims.

The invention claimed is:

1. A method of measuring network performance, comprising the following steps:
   transmitting via a communication network, a total number of payload packets from a sending node to a receiving node;
   generating at the sending node, a short list comprising a send specification for each payload packet in a selected subset of the transmitted payload packets, wherein the selected subset includes at least two transmitted payload packets and less than the total number of transmitted payload packets, and wherein each packet's send specification includes a send time stamp and a packet send identifier;
   generating at the receiving node, a long list comprising a receive specification for each of the total number of transmitted payload packets, wherein each packet's receive specification includes a receive time stamp and a packet receive identifier;
   sending the short list of send specifications from the sending node to the receiving node, using a different packet from the transmitted payload packets;
   bringing together at the receiving node, the generated send specifications and generated receive specifications;
   comparing at the receiving node, the packet send identifiers and the packet receive identifiers, to determine which packets in the long list correspond to the selected subset of packets in the short list; and
   estimating network performance by utilizing the send specifications and the receive specifications of the packets in the long list that correspond to the selected subset of packets in the short list.

2. The method of measuring network performance according to claim 1, wherein a packet's send specification further comprises a packet's size and wherein a packet's receive specification further comprises the packet's size.

3. The method of measuring network performance according to claim 1, comprising the following further steps:
   forwarding from the receiving node to a third node, the send specifications and the receive specifications of the packets in the long list that correspond to the selected subset of packets in the short list;
   wherein the step of estimating the network performance is performed at the third node.

4. The method of measuring network performance according to claim 1, comprising the following further steps:
   forwarding from the receiving node to the sending node, the send specifications and the receive specifications of the packets in the long list that correspond to the selected subset of packets in the short list;
   wherein the step of estimating the network performance is performed at the sending node.

5. An arrangement for measuring network performance, comprising:
   a transmitter configured to transmit via a communication network, a total number of payload packets from a sending node to a receiving node;
   a processor configured to generate at the sending node, a short list comprising a send specification for each payload packet in a selected subset of the transmitted payload packets, wherein the selected subset includes at least two transmitted payload packets and less than the total number of transmitted payload packets, and wherein each packet's send specification includes a send time stamp and a packet send identifier;
   the processor further configured to generate at the receiving node, a long list comprising a receive specification for each of the total number of transmitted payload packets, wherein each packet's receive specification includes a receive time stamp and a packet receive identifier;
   the transmitter further configured to send the short list of send specifications from the sending node to the receiving node, using a different packet from the transmitted payload packets;
   the processor further configured to bring together at the receiving node, the generated send specifications and generated receive specifications;
   the processor further configured to compare at the receiving node, the packet send identifiers and the packet receive identifiers, to determine which packets in the long list correspond to the selected subset of packets in the short list; and the processor further configured to estimate network performance by utilizing the send specifications and the receive specifications of the packets in the long list that correspond to the selected subset of packets in the short list.

6. The arrangement for measuring network performance according to claim 5, wherein a packet's send specification further comprises a packet's size and/or wherein a packet's receive specification further comprises a packet's size.

7. The arrangement for measuring network performance according to claim 5, further comprising:
   a second transmitter configured to forward from the receiving node to a third node, the send specifications and the receive specifications of the packets in the long list that correspond to the selected subset of packets in the short list; and
   the processor further configured to estimate the network performance at the third node.

8. The arrangement for measuring network performance according to claim 5, further comprising:
   a second transmitter configured to forward from the receiving node to the sending node, the send specifications and the receive specifications of the packets in the long list that correspond to the selected subset of packets in the short list; and
   the processor further configured to estimate the network performance at the sending node.

9. A non-transitory computer readable medium having stored thereon a plurality of instructions including instructions which, when executed by a processor, cause the processor to perform the steps of a method for measuring network performance, comprising:
   transmitting via a communication network, a total number of payload packets from a sending node to a receiving node;
   generating at the sending node, a short list comprising a send specification for each payload packet in a selected subset of the transmitted payload packets, wherein the selected subset includes at least two transmitted payload packets and less than the total number of transmitted payload packets, and wherein each packet's send specification includes a send time stamp and a packet send identifier;
   generating at the receiving node, a long list comprising a receive specification for each of the total number of transmitted payload packets, wherein each packet's receive specification includes a receive time stamp and a packet receive identifier;
   sending the short list of send specifications from the sending node to the receiving node, using a different packet from the transmitted payload packets;
   bringing together at the receiving node, the generated send specifications and generated receive specifications;
   comparing at the receiving node, the packet send identifiers and the packet receive identifiers, to determine which packets in the long list correspond to the selected subset of packets in the short list; and
   estimating network performance by utilizing the send specifications and the receive specifications of the packets in the long list that correspond to the selected subset of packets in the short list.

10. A receiving node in a network for measuring network performance, comprising:
    a receiver configured to receive a total number of payload packets from a sending node;
    a processor configured to bring generated send specifications and generated receive specifications together;
    wherein the send specifications are generated at the sending node for each payload packet in a short list comprising a selected subset of the total number of payload packets, wherein the selected subset includes at least two payload packets and less than the total number of payload packets, and wherein each packet's send specification includes a send time stamp and a packet send identifier;
    wherein the receive specifications are generated at the receiving node for each of the total number of received payload packets, wherein each packet's receive specification includes a receive time stamp and a packet receive identifier;
    the receiver configured to receive the send specifications using a different packet from the received payload packets;
    the processor further configured to compare, the packet send identifiers and the packet receive identifiers, to determine which packets in the long list correspond to the selected subset of packets in the short list; and
    the processor further configured to estimate network performance by utilizing the send specifications and the receive specifications of the packets in the long list that correspond to the selected subset of packets in the short list.

* * * * *